United States Patent [19]

Castle et al.

[11] Patent Number: 5,071,389
[45] Date of Patent: Dec. 10, 1991

[54] COMPACT GAMBREL

[76] Inventors: Kevin L. Castle, P.O. Box 811, Shingle Springs,, Calif. 95682; Thomas H. Endean, 6626 Merchandise Way, Diamond Springs, Calif. 95619

[21] Appl. No.: 653,026

[22] Filed: Feb. 8, 1991

[51] Int. Cl.⁵ ............................................. A22C 25/18
[52] U.S. Cl. .................................. 452/192; 452/187; 452/189
[58] Field of Search ............... 452/192, 189, 190, 191, 452/187

[56] References Cited

U.S. PATENT DOCUMENTS

| | | |
|---|---|---|
| 901,947 | 10/1908 | Brooks ................. 452/192 |
| 1,006,955 | 10/1911 | Lace . |
| 1,044,060 | 11/1912 | Lace . |
| 1,107,467 | 8/1914 | Walsh . |
| 1,148,681 | 8/1915 | Hoogewoning . |
| 1,404,436 | 1/1922 | Giroux . |
| 2,622,914 | 12/1952 | Elling et al. . |
| 2,750,224 | 6/1951 | Matheny ............... 452/192 |
| 3,194,599 | 7/1965 | Ambill . |
| 3,837,699 | 9/1974 | Anderson et al. . |
| 4,027,357 | 6/1977 | Morris ................. 452/192 |
| 4,759,101 | 7/1988 | Hyatt . |

FOREIGN PATENT DOCUMENTS

| | | |
|---|---|---|
| 0132597 | 7/1902 | Fed. Rep. of Germany ...... 452/192 |
| 0138139 | 1/1903 | Fed. Rep. of Germany ...... 452/192 |

OTHER PUBLICATIONS

Cabela's 1990 Fall Catalog from Cabela's 812 13th Ave. Sidney, NE 69160 on p. 195.

Primary Examiner—James G. Smith
Assistant Examiner—Lawrence Cruz
Attorney, Agent, or Firm—James M. Ritchey

[57] ABSTRACT

A lightweight, collapsible gambrel for carrying or lifting an animal carcass is provided having a central support member for securing a manipulative tether and two opposing foldable branch members pivotally attached to the central support member. Each branch member has a proximal and a distal arm, pivotally connected to one another. Two folding prongs, for anchoring a portion of the carcass, are associated with each distal arm.

7 Claims, 4 Drawing Sheets

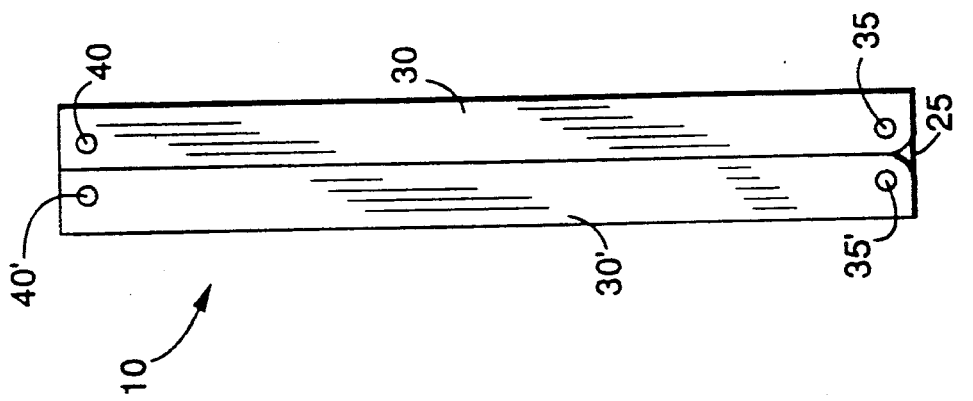
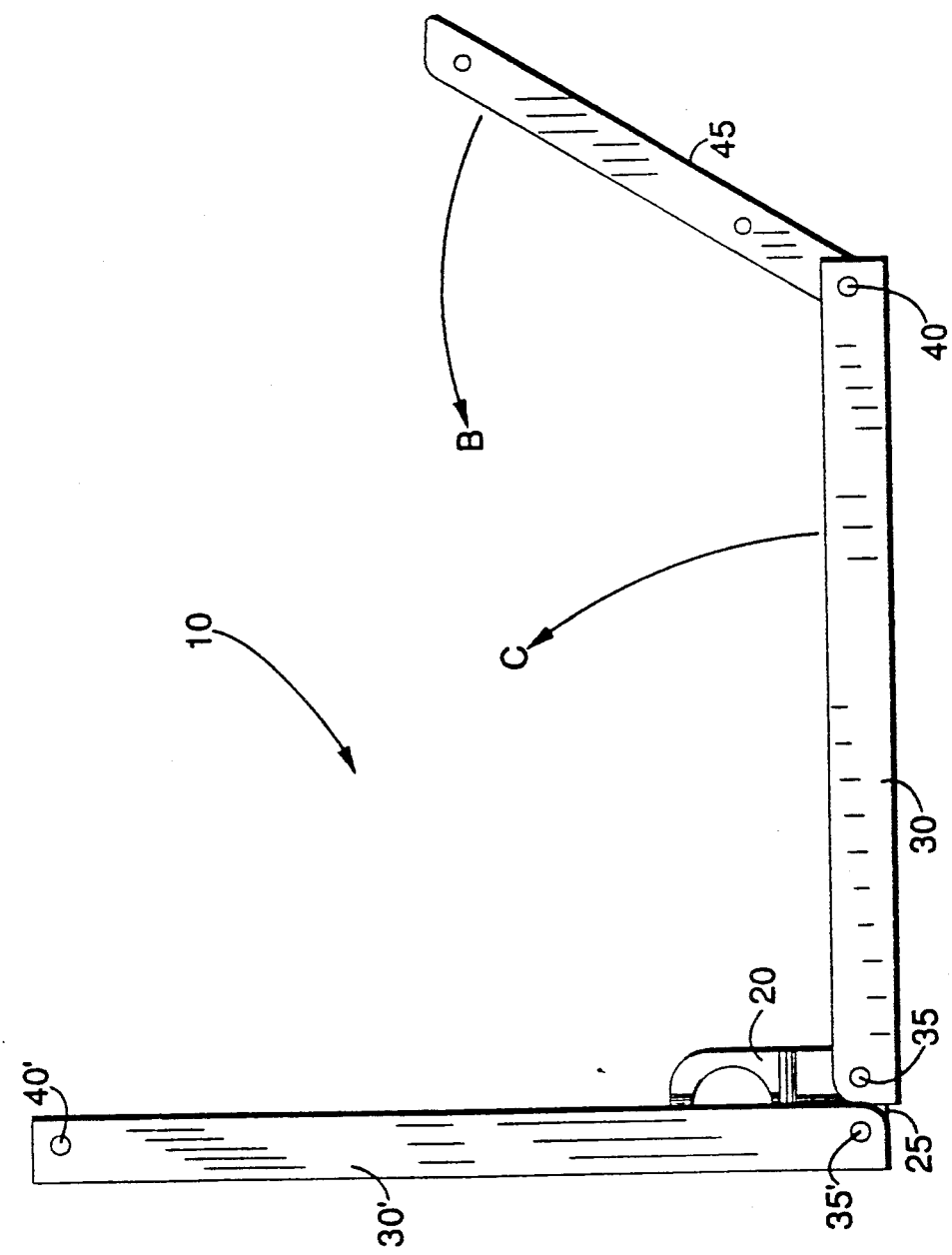

COMPACT GAMBREL

BACKGROUND OF THE INVENTION

1. Field of the Invention

A versatile and portable gambrel for carrying or supporting an animal carcass is disclosed. Since the subject invention is lightweight and foldable to approximately pocket-sized form, it is particularly suited for use by hunters.

2. Description of the Background Art

Gambrels are devices that fasten to a carcass of an animal to permit a user to move or hoist the carcass into a required position for transportation, butchering, or similar procedure. Typical users include, but are not limited to, hunters, butchers, farmers, and ranchers. Over the years numerous gambrels have been created, but all of these have suffered from handicaps such as being generally too bulky to easily transport, complicated with numerous parts, and often weighing many pounds. The subject apparatus overcomes these and other prior difficulties by being collapsible or foldable, structurally strong yet lightweight, and relatively simple in construction.

Specifically, U.S. Pat. Nos. 1,006,955 and 1,044,060 disclose a gambrel having two opposing apertures with clutch arm securing components that fasten on the legs of an animal carcass. A rigid central shaft connects the two clutch arm securing components into a fixed structure.

Related within U.S. Pat. No. 1,107,467 is a slidably adjustable gambrel with telescoping arm members. Each arm member is slid in or out of a receiving socket to accommodate a smaller or larger carcass. Each arm terminates in a holding jaw that clamps reversibly onto the leg of a carcass.

Revealed in U.S. Pat. No. 1,148,681 is a gambrel having a carcass leg securing hook at each end of a rigid, elongated, central body. Within each hook is a lever that cinches, due to gravity, upon a carcass leg. To permit removal of the carcass leg, upward movement or the leg releases the lever.

A meat hanging device is communicated is U.S. Pat. No. 1,404,436. A rigid, horseshoe shaped, central body has holding bars positioned proximate each of its two ends. Each bar is fitted within a receiving opening in the central body and so positioned that when a portion of a carcass is placed between the bars the carcass is wedged into fixed orientation.

In U.S. Pat. No. 2,622,914 is related a gambrel having a spring associated clamp for securing the legs of a carcass. Two opposing cinch plates are attached to the ends of pivotally coupled elongated members. Both cinch plates function together to secure the carcass.

U.S. Pat. No. 3,194,599 discloses a self-clamping suspension gambrel. A rigid, generally rectangular central member with two opposing rounded ends has an open interior that contains two pivoted clamping arms. Each pivoted clamping arm cinches upon a carcass leg to secure the carcass.

A method and apparatus for breaking animal carcasses and handling meat products is given in U.S. Pat. No. 3,837,699. A device strikingly similar to traditional ice tongs, functioning on a scissoring mechanism, is suspended from an overhead support. Opposing meat engaging plates, each with a securing spike, scissor or pinch the carcass into a fixed position. An upwardly directed spike is attached to one of the scissor arms to aid in holding portions of the carcass.

A triangular apparatus for holding small game animals or fish during skinning, scaling, or butchering operations is depicted in U.S. Pat. No. 4,759,101. Two opposing serrated arms clamp a carcass within a triangular opening generated by the two serrated arms and a third serrated member spanning the two serrated arms.

Finally, a typical gambrel used by hunters is disclosed on page 195 of the Fall 1990 catalog from "Cabela's" (Cabela's, 812 13th Avenue, Sidney, Nebr., 69160). A pulley system is incorporated into a rigid "coat hanger" like construction. To secure a carcass, hooks positioned at the tips of the "coat hanger" (nearly two feet between the hooks) penetrate the hind leg joints of the carcass.

SUMMARY OF THE INVENTION

An object of the present invention is to provide a foldable gambrel that when needed is unfolded to generate a sturdy attachment point for hauling or lifting an animal carcass.

Another object of the current invention is to produce a lightweight gambrel that is easily carried any required distance.

An additional object of the present invention is to create a gambrel that is foldable into a small, compact unit for transportation and storage.

A lightweight, collapsible gambrel for carrying, dragging, hauling, or lifting an animal carcass is provided. The entire subject device is easily carried within a slender sheath holder secured to a user's belt. The subject apparatus has a central support member for securing a manipulative tether and two opposing foldable branch members pivotally attached to the central support member. Each branch member has a proximal arm pivotally connected to a distal arm. For anchoring a portion of the carcass, two folding prongs, are associated with each distal arm.

Other objects, advantages, and novel features of the present invention will become apparent from the detailed description that follows, when considered in conjunction with the associated drawings.

BRIEF DESCRIPTION OF THE DRAWINGS

FIG. 4 is a side view of the subject apparatus showing complete folding of the arms.

FIG. 5 is a side view of the subject apparatus showing one half of the apparatus (left side) with folded arms and the other half (right side) with partially folded arms.

DESCRIPTION OF THE PREFERRED EMBODIMENT

Referring now to FIGS. 1-5, there is shown a preferred embodiment of a lightweight, foldable or collapsible gambrel for carrying, supporting, lifting, or suspending an animal carcass. Preferably, the carcass supported by the subject apparatus weighs less than about 400 pounds (such as a deer and the like). The subject gambrel serves as a stable attachment point for securing an animal carcass for processing. Once a carcass is secured by the gambrel, a user may haul the carcass over the ground or, by means of an additional tether, hoist the carcass for butchering, storing, or like procedures. The subject apparatus has a central support member for securing a manipulative tether and two opposing foldable branch members pivotally attached to the central support member. Each branch member has a proximal arm pivotally connected to a distal arm. For anchoring a portion of the carcass, two folding prongs, are associated with each distal arm. Although, due to compact and lightweight construction, the subject apparatus is transportable by any selected means (in a pocket, backpack, vehicle glove compartment, and the like), a preferred manner is within a slender sheath holder (similar to those employed to carry a sheath knife) secured to a user's belt.

Figure 1:
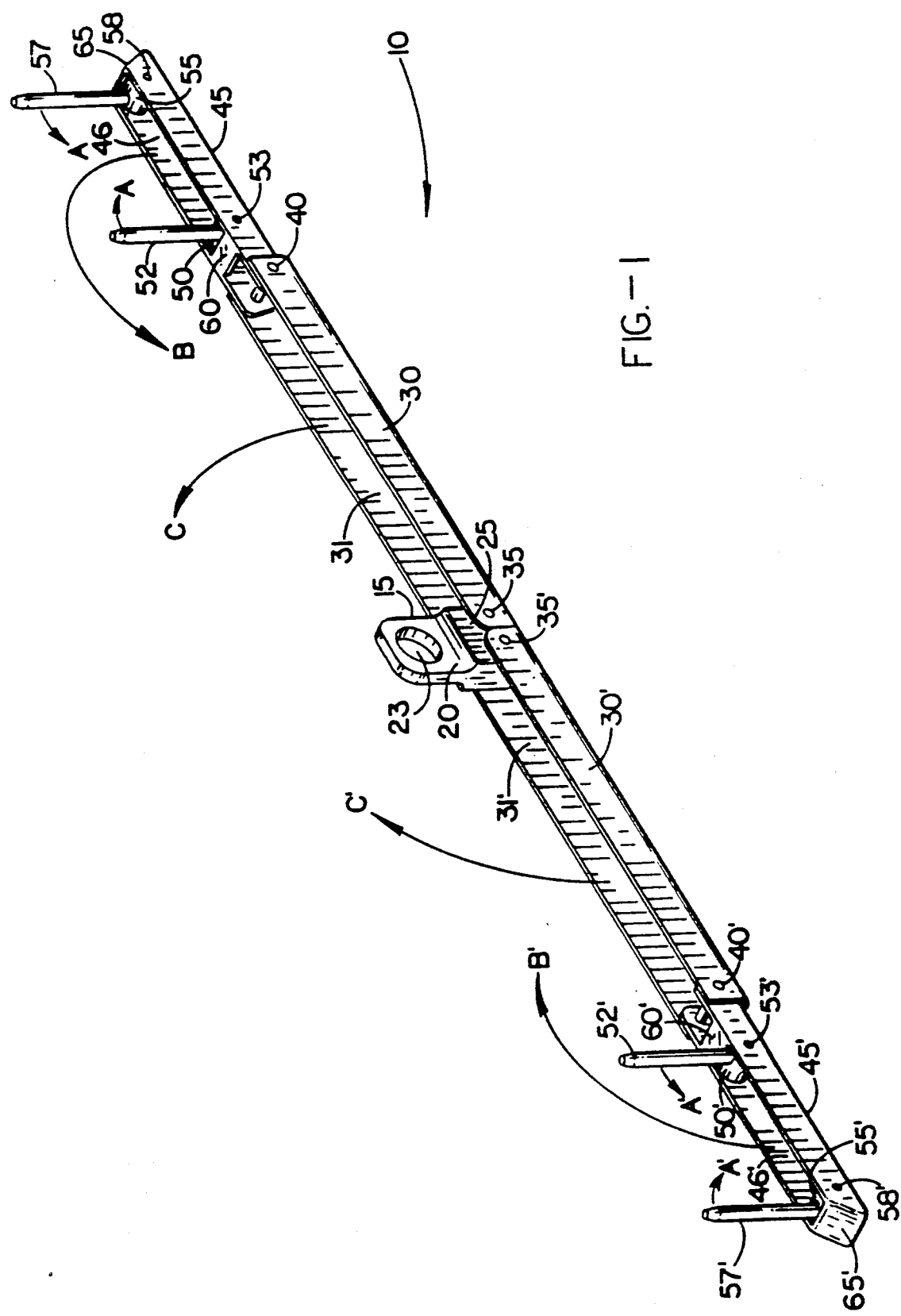
FIG. 1 is a perspective view of the subject apparatus showing unfolded arms with extended prongs.

More specifically, the subject gambrel 10 is depicted in FIG. 1 in its completely open or unfolded form and in FIG. 4 in its completely closed or folded form. A central support member 15 comprises upper 20 and lower 25 portions or areas. Included in the upper portion 20 is a means for connecting a tether (the term tether includes, but is not limited to, a cable, rope, chain, and the like). Such a connected tether allows a user to haul or lift the carcass by applying an appropriate force. A preferable connection means is an aperture penetrating the upper portion 20 for receiving the tether.

Contiguous with the upper portion 20 and completing the central support member 15 is the lower portion 25 which is pivotally secured or connected to two foldable branch members. Viewing the figures, it is evident that the subject device 10 is usually symmetrical about (having mirror related right and left sides) a plane of symmetry dividing the central support member 10 between the two branch members. It must be remembered that those skilled in the art may make obvious changes to destroy this symmetry, yet maintain the basic intent of the subject device, but such variations are considered to be within the realm of this disclosure. To facilitate the description of the subject device, the right side elements of the device will carry no prime, while the left side elements will be designated with an associated prime (').

For each branch member, the main components comprise; one proximal arm (30 or 30'), one distal arm (45 or 45'), and means for securing the carcass to the branch member at the distal arm (45 or 45'). Each proximal arm (30 or 30') has two opposing ends. One end of each proximal arm is pivotally secured to the lower portion 25 of the central support member 15. Pivotal securement is by stand means such as a hinge generated by introducing a rotational axle or pin (35 or 35') such as a rivet, bolt, or the like through each proximal arm and the central support member's lower portion 25. Preferably, a rivet with its exposed portions (head and tip) smoothed flush with the outer surfaces of each proximal arm (30 or 30') is employed to produce the axle (35 or 35'). Usually, a proximal arm (30 or 30') is constructed from an elongated and generally U-shaped member having a channel (31 or 31') extending between the two opposing ends. As is clearly shown in FIGS. 1 and 2a, the central support's lower portion 25 mates or fits within the one end of each proximal arm (30 or 30').

Figure 2A:
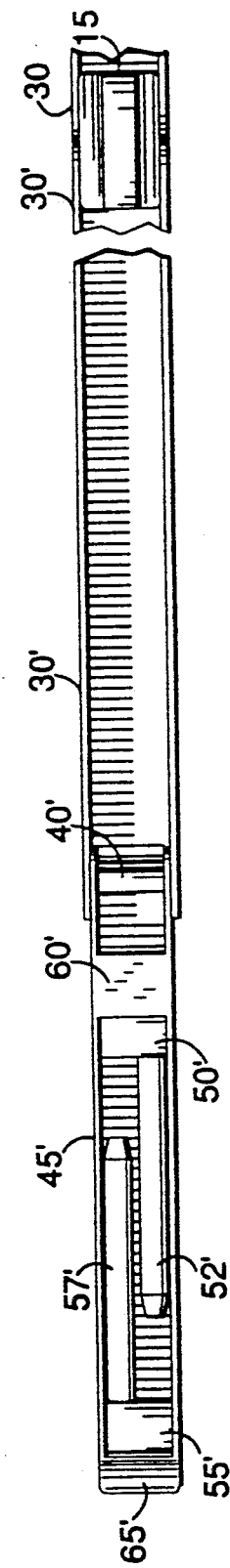
FIG. 2a is a top view of the "left" side of the subject apparatus showing the unfolded left arms with retracted prongs.
Figure 3A:
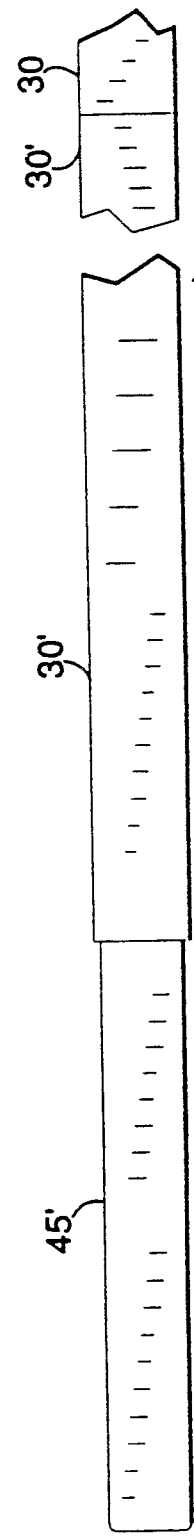
FIG. 3a is a bottom view of the "left" side of the subject apparatus showing unfolded left arms.

The ends of the U-shaped proximal arms (30 or 30') are so positioned to abut one another when fully or completely unfolded or opened (as seen in FIGS. 1, 2a, and 3a). The axles (35 or 35') fix the proximal arms (30 or 30') relative to the central support 15 and generate, during normal unfolded use, an up-side-down letter "T" with the leg being the central support member 15 and the cross-bar being the combined right 30 and left 30' proximal arms. Each proximal arm (30 or 30') is able to pivot, swing, or hinge (via the associated axle (35 or 35')) back onto and enclose half way the central supporting member 15 within its channel (31 or 31') along the movement arrows C (in FIGS. 1 and 5) or C' (in FIG. 1).

For pivotally securing a distal arm (45 or 45') to the appropriate proximal arm (30 or 30') a rotational axle or pin (40 or 40') is provided. Each proximal-to-distal arm axle (40 or 40') is similar to the central support member-to-proximal arm axle (35 or 35') described above. The pin or axle (40 or 40') penetrates and usually spans the proximal arm (30 or 30') and distal arm (45 or 45') to secure one end of a two ended distal arm (45 or 45'), preferably, within the proximal arm channel (31 or 31').

Each distal arm (45 or 45') is preferably an elongated U-shaped member having a channel (46 or 46') extending between the two opposing ends. With the opening of a proximal arm channel (31 or 31') aligned in the same direction as a distal arm channel (46 or 46'), the dimensions of the distal arm (45 or 45') is such that it fits within the proximal arm channel (31 or 31'). The length (between opposing ends) of each distal arm (45 or 45') is less than the corresponding length of the proximal arm (30 or 30') to which it is pivotally secured. These dimensions permit the distal arm (45 or 45') to swing or hinge back into the proximal arm channel (31 or 31') along the movement arrows B (in FIGS. 1 and 5) or B' (in FIG. 1). Further, since a distal arm (45 or 45') unfolds about the pivot axle (40 or 40'), the bottom portion of the appropriate proximal arm U-shaped channel (31 or 31') serves as a stop that prevents the distal arm (45 or 45') from unfolding more than about 180° from within the proximal arm channel (31 or 31'). When both proximal arms (30 and 30') and both distal arms (45 and 45') are completely unfolded an up-side-down letter "T" with the leg being the central support member 15 and the elongated cross-bar being the combined right 30 and left 30' proximal arms and right 45 and left 45' distal arms. Applying force (such a force is used to lift or haul a carcass) up through the central support 15 will not significantly distort the inverted "T" shape of the unfolded device.

Within each distal arm (45 or 45') are pivotally attached proximal (52 or 52') and distal (57 or 57') prongs with each prong having two opposing ends and a longitudinal axis running between the ends. The prongs serve as means for securing the carcass. Each set of prongs (a set consists of one proximal and one distal prong) functions jointly or independently from one another and each set serves to fasten to the same or a different portion of the carcass. A prong set (either 52 and 57 or 52' and 57') may attach to the carcass at the same time as the other prong set (either 52 and 57 or 52' and 57') or one set at a time. Each proximal prong (52 or 52') attaches proximate one end (nearest the central support member 15) and within the channel (46 or 46') of a distal arm (45 or 45') and each distal prong (57 or 57') attaches proximate the other end and within the channel (46 or 46') of a distal arm (45 or 45').

Each prong has two regions, a spike segment starting at one end and an associated base at the other end of the longitudinal prong axis. For each prong, the base fits within and generally spans the channel (46 or 46') and serves as the pivotal attachment point. An axle or pin (53 or 53' for the proximal prong and 55 or 55' for the distal prong) passes through each prong base and secures to each side of the distal arm (45 or 45'). Each set of prongs (52 and 57 or 52' and 57') pivots along the movement arrows designated in FIG. 1 as A (for 52 and 57) or A' (for 52' and 57'). When the prongs are fully closed they reside within the appropriate channel (46 or 46'). A preferred manner to permit both prongs to lie within a channel is to have a set of prongs off-set within each distal arm channel (46 or 46') (see FIGS. 2a and 2b for the off-set alignment). When each proximal and distal prong's longitudinal axes are essentially within the appropriate distal arm channel (46 or 46'), the off-set permits each proximal prong (52 and 52') and each distal prong (57 and 57') to fit side-by-side within a distal arm channel (46 or 46').

Figure 2B:
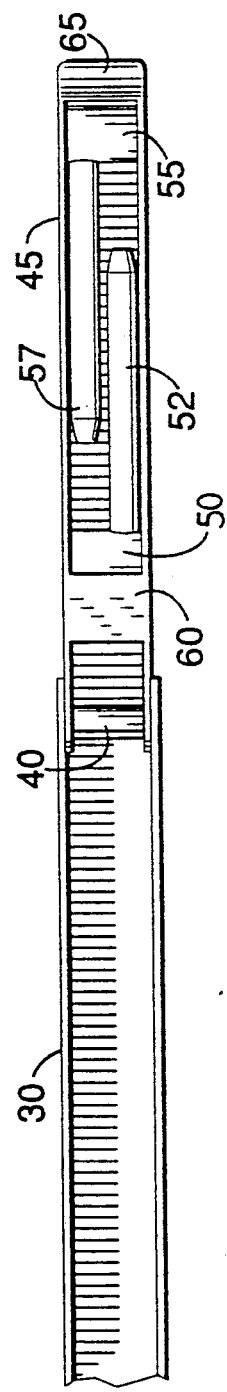
FIG. 2b is a top view of the "right" side of the subject apparatus showing the unfolded right arms with retracted prongs.
Figure 3B:
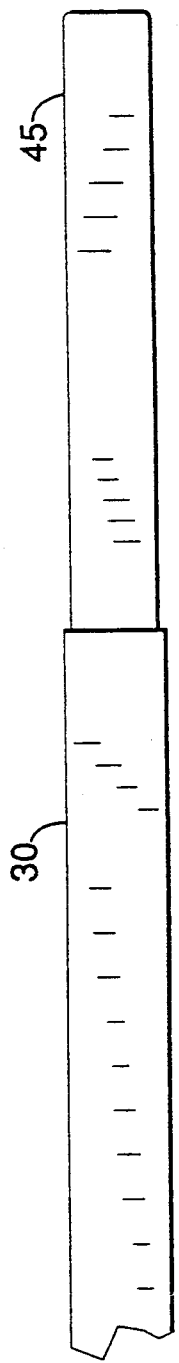
FIG. 3b is a bottom view of the "right" side of the subject apparatus showing unfolded right arms.

When a prong swings or pivots out from within a distal arm channel (46 or 46'), the prong's movement is stopped by the placement of a prong stop (60 and 60' for proximal stops and 65 and 65' for distal stops) proximate each end of each distal arm (45 or 45'). A proximal prong stop (60 and 60') is usually placed over a channel (46 or 46') and proximate one distal arm end. A distal prong stop (65 and 65') is usually placed over the other end of the channel (46 or 46') to close the channel (46 or 46') Preferably, as seen in FIGS. 1, 2a, and 2b, a prong stop is a plate that either spans (60 or 60') or caps (65 or 65') the distal channel (46 or 46'). Typically, a spanning prong stop (60 or 60') is affixed to both sides of the channel (46 or 46') and a capping prong stop (65 or 65') is affixed to both sides of the channel and the bottom of the channel (46 or 46'). Each prong stop (also, other equivalent prong stopping methods are considered to be within the realm of this disclosure) prevents the related prong from traveling or pivoting out of its associated channel through an arc of more than about 145°, relative to a base line extending parallel with the channel of each related distal arm (45 or 45'). When a portion of a carcass is wedged between a set of opened prongs (52 and 57 or 52' and 57') the prong stops serve to lock each prong into a position projecting away from the associated distal arm (45 or 45'). The 145° angle is illustrative and may be greater or lesser according to the specific dimensions or shape of the carcass. It should be noted that although FIGS. 2a and 2b indicate that both distal prongs (57 and 57') are displace to the same side of proximal prongs (52 and 52') (here, both 57 and 57' towards the top of FIGS. 2a and 2b), one set of prongs could have the reverse orientation without altering the functioning of the subject device.

Since the subject device is used in connection with an animal carcass and the prevention of corrosion to the device is important, it is preferably fabricated from sturdy materials such as stainless steel, or similar metals and alloys or suitable polymers. Further, stainless steel provides sufficient structural stability to support a carcass weighing usually less than about 400 pounds (although larger versions of the subject device may be constructed to handle weightier carcasses). When fabricated from stainless steel, a typical apparatus, sufficient to hold a carcass of less than about 400 pounds, weight only about one pound or less.

By way of example and not by way of limitation, one typical user of the subject device is a hunter tracking game, such as deer, in a generally remote area where no vehicles are permitted or, perhaps, possible. After a kill, the hunter needs to dress or gut the carcass for transportation to a camp or a waiting vehicle. The subject device, in its folded form (see FIG. 4), is carried by the hunter in a belt sheath or within a pocket or pack. Usually, to employ the subject apparatus penetrating cuts are made in the carcass near the leg joints. Both sets of proximal (30 and 30') and distal (45 and 45') arms of the subject apparatus are opened or unfolded. The proximal prongs (52 and 52') are pivoted up to project away from the distal arms (45 and 45'). Each capped end (65 or 65') of the distal arms (45 or 45') is inserted through the cuts in the carcass. Each distal arm (45 or 45') stops when the leg hits the projecting proximal prong (52 or 52'). Each distal prong (57 or 57') is unfolded to wedge the leg within each set of projecting prongs (52 and 57 or 52' and 57'). The carcass is then raised by attaching a tether to the central support member 15 and hoisted into position. Alternatively, should the hunter desire to drag the carcass, since the reverse or non-channeled side of the subject device is smooth (see, FIGS. 3a and 3b for the reverse side), the hunter simply employs the subject invention as a handle by grabbing the device near the central support member 15 midpoint and pulling.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A collapsible gambrel for securing a carcass of an animal comprising:
   a) a central support member;
   b) first and second proximal arms with each said proximal arm having first and second opposing ends wherein said first end of each said proximal arm is pivotally secured to said central support;
   c) first and second distal arms with each said distal arm having first and second opposing ends wherein said first end of said first distal arm is pivotally secured to said second end of said first proximal arm and said first end of said second distal arm is pivotally secured to said second end of said second proximal arm;
   d) first means associated with said first distal arm for securing said carcass to said first distal arm, wherein said first securing means comprises first and second proximal prongs with said first proximal prong pivotally secured proximate said first distal arm first end and said second proximal prong pivotally secured proximate said second distal arm first end; and
   e) second means associated with said second distal arm for securing said carcass to said second distal arm, wherein said second securing means comprises first and second distal prongs with said first distal prong pivotally secured proximate said first distal arm second end and said second distal prong pivotally secured proximate said second distal arm second end, wherein said first and said second securing means function jointly or independently from one another to secure said carcass.

2. A collapsible gambrel for securing a carcass of an animal comprising:
   a) a central support member with upper and lower portions wherein said upper portion includes means for connecting a tether to said support member;
   b) first and second proximal arms with each said proximal arm having both first and second opposing ends and a channel extending between said first and second ends wherein said first end of each said proximal arm is pivotally secured to said lower portion of said central support;
   c) first and second distal arms with each said distal arm having both first and second opposing ends and a channel extending between said first and second ends wherein said first end of said first distal arm is pivotally secured to said second end of said first proximal arm and said first end of said second distal arm is pivotally secured to said second end of said second proximal arm;
   d) first and second proximal prongs with said first proximal prong pivotally secured proximate said first distal arm first end and said second proximal prong pivotally secured proximate said second distal arm first end; and
   e) first and second distal prongs with said first distal prong pivotally secured proximate said first distal arm second end and said second distal prong pivotally secured proximate said second distal arm second end.

3. A gambrel according to claim 2, further comprising for each said prong a prong stop spanning said distal arm channel that prevents each said prong from pivoting more than about 145° from a base line extending parallel with said channel of each said distal arm.

4. A collapsible gambrel for securing a carcass of an animal comprising:
   a) a central support member with upper and lower portions wherein said upper portion includes an aperture for connecting a tether to said support member;
   b) first and second generally U-shaped proximal arms with each said proximal arm having both first and second opposing ends and a channel extending between said first and second ends wherein said central support lower portion mates and is pivotally secured within said channel of said first end of both said proximal arms;
   c) first and second generally U-shaped distal arms with each said distal arm having both first and second opposing ends and a channel extending between said first and second ends wherein said first end of said first distal arm is pivotally secured to said second end of said first proximal arm and said first end of said second distal arm is pivotally secured to said second end of said second proximal arm;
   d) first and second proximal prongs, each said prong having two opposing end with a longitudinal axis running between said ends, with said first proximal prong pivotally secured by one said end within said first distal arm channel proximate said first distal arm first end and said second proximal prong pivotally secured by one said end within said second distal arm channel proximate said second distal arm first end; and
   e) first and second distal prongs, each said prong having two opposing end with a longitudinal axis running between said ends, with said first distal prong pivotally secured by one said end within said first distal arm channel proximate said first distal arm second end and said second distal prong pivotally secured by one said end within said second distal arm channel proximate said second distal arm second end.

5. A gambrel according to claim 4, wherein said first end of said first distal arm fits within said channel of said second end of said first proximal arm to be pivotally secured and said first end of said second distal arm fits within said channel of said second end of said second proximal arm to be pivotally secured.

6. A gambrel according to claim 4, wherein said first proximal prong is off-set within said first distal arm channel from said first distal prong thereby permitting said first proximal and distal prongs to fit side-by-side within said first distal arm channel when said first proximal and distal prong's longitudinal axes are within said first distal arm channel and said second proximal prong is off-set within said second distal arm channel from said second distal prong thereby permitting said second proximal and distal prongs to fit side-by-side within said second distal arm channel when said second proximal and distal prong's longitudinal axes are within said second distal arm channel.

7. A gambrel according to claim 4, further comprising for each said prong a prong stop spanning said distal arm channel that prevents each said prong's longitudinal axis from pivoting more than about 145° from a base line extending parallel with said channel of each said distal arm.

* * * * *